(12) United States Patent
Spare

(10) Patent No.: US 11,024,887 B2
(45) Date of Patent: *Jun. 1, 2021

(54) CONSTRUCTION OF NON-RECTANGULAR BATTERIES

(71) Applicant: Apple Inc., Cupertino, CA (US)

(72) Inventor: Bradley L. Spare, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 16/180,614

(22) Filed: Nov. 5, 2018

(65) Prior Publication Data

US 2019/0074549 A1 Mar. 7, 2019

Related U.S. Application Data

(63) Continuation of application No. 14/606,975, filed on Jan. 27, 2015, now Pat. No. 10,135,097, which is a
(Continued)

(51) Int. Cl.
*H01M 10/0585* (2010.01)
*H01M 10/04* (2006.01)
(Continued)

(52) U.S. Cl.
CPC ..... *H01M 10/0585* (2013.01); *H01M 10/049* (2013.01); *H01M 10/0436* (2013.01);
(Continued)

(58) Field of Classification Search
CPC .... H01M 2/021; H01M 2/026; H01M 2/0275; H01M 2/266; H01M 2/30;
(Continued)

(56) References Cited

U.S. PATENT DOCUMENTS 5,478,668 A 12/1995 Gozdz et al.
5,910,382 A 6/1999 Goodenough et al.
(Continued)

FOREIGN PATENT DOCUMENTS

CN 1314008 9/2001
CN 1508899 6/2004
(Continued)

*Primary Examiner* — Sean P Cullen
(74) *Attorney, Agent, or Firm* — BakerHostetler

(57) ABSTRACT

The disclosed embodiments relate to a battery cell which includes a first electrode sheet having a first area and a second electrode sheet having a second area. The second area may be less than the first area. The battery cell also includes a first conductive tab coupled to the first electrode sheet and a second conductive tab coupled to the second electrode sheet. An insulator is disposed between the second conductive tab and the first electrode sheet, the insulator configured to prevent electrical current from flowing between the first electrode sheet and the second conductive tab. The battery cell also includes a pouch that encloses the first and second electrode sheets and a first and second battery terminal extending through the pouch. The first battery terminal may be coupled to the first conductive tab, and the second battery terminal may be coupled to the second conductive tab.

17 Claims, 6 Drawing Sheets

Related U.S. Application Data continuation of application No. 12/837,932, filed on Jul. 16, 2010, now Pat. No. 8,940,429.

(51) Int. Cl.

| | | |
|---|---|---|
| *H01M 10/0565* | (2010.01) | |
| *H01M 50/54* | (2021.01) | |
| *H01M 50/116* | (2021.01) | |
| *H01M 50/543* | (2021.01) | |
| *H01M 10/0525* | (2010.01) | |
| *H01M 50/10* | (2021.01) | |

(52) U.S. Cl.
CPC ... *H01M 10/0472* (2013.01); *H01M 10/0525* (2013.01); *H01M 10/0565* (2013.01); *H01M 50/116* (2021.01); *H01M 50/54* (2021.01); *H01M 50/543* (2021.01); *H01M 50/10* (2021.01); *H01M 2220/30* (2013.01); *Y02E 60/10* (2013.01)

(58) Field of Classification Search
CPC ......... H01M 10/0585; H01M 10/0436; H01M 10/0472; H01M 10/049; H01M 10/0525; H01M 10/0565
USPC .................................................. 429/153, 179
See application file for complete search history.

(56) References Cited

U.S. PATENT DOCUMENTS

| | | | |
|---|---|---|---|
| 5,916,707 | A | 6/1999 | Omaru et al. |
| 6,040,078 | A | 3/2000 | Fauteux et al. |
| 6,224,995 | B1 | 5/2001 | Fauteux et al. |
| 6,432,574 | B1 | 8/2002 | Suzuki et al. |
| 6,991,873 | B2 | 1/2006 | Sakai et al. |
| 7,092,746 | B2 | 8/2006 | Infanti |
| 7,432,018 | B2 | 10/2008 | Taguchi |
| 8,440,938 | B2 | 5/2013 | Chami et al. |
| 8,592,065 | B2 | 11/2013 | Bhardwaj et al. |
| 8,940,429 | B2 | 1/2015 | Spare |
| 9,276,287 | B2 | 3/2016 | Bhardwaj et al. |
| 10,135,097 | B2 | 11/2018 | Spare |
| 2001/0005561 | A1 | 6/2001 | Yamada et al. |
| 2001/0019795 | A1 | 9/2001 | Yoshida et al. |
| 2002/0150816 | A1 | 10/2002 | Sakai et al. |
| 2002/0157242 | A1 | 10/2002 | Fukuda et al. |
| 2003/0077509 | A1 | 4/2003 | Probst et al. |
| 2003/0148173 | A1 | 8/2003 | Gu |
| 2003/0232236 | A1 | 12/2003 | Mitchell et al. |
| 2004/0033416 | A1 | 2/2004 | Kim et al. |
| 2004/0119442 | A1 | 6/2004 | Lee et al. |
| 2004/0127952 | A1 | 7/2004 | O'Phelan et al. |
| 2005/0188533 | A1 | 9/2005 | Righi et al. |
| 2005/0272479 | A1 | 12/2005 | Infanti |
| 2005/0287437 | A1 | 12/2005 | Fukumine et al. |
| 2006/0024572 | A1 | 2/2006 | Lee |
| 2006/0105237 | A1 | 5/2006 | Oh |
| 2006/0154145 | A1 | 7/2006 | Lee et al. |
| 2006/0210872 | A1 | 9/2006 | Yageta et al. |
| 2007/0031733 | A1 | 2/2007 | Kogetsu et al. |
| 2007/0105014 | A1 | 5/2007 | Shin et al. |
| 2007/0231683 | A1 | 10/2007 | Lee et al. |
| 2008/0153000 | A1 | 6/2008 | Salot et al. |
| 2008/0248386 | A1 | 10/2008 | Obrovac |
| 2009/0029246 | A1 | 1/2009 | Kim |
| 2009/0095808 | A1 | 4/2009 | Naccache |
| 2009/0117462 | A1 | 5/2009 | Okazaki et al. |
| 2009/0197162 | A1 | 8/2009 | Shinyashiki et al. |
| 2009/0202908 | A1 | 8/2009 | Sumihara et al. |
| 2009/0239133 | A1 | 9/2009 | Chinichiro |
| 2009/0248356 | A1 | 10/2009 | Kriegmair |
| 2010/0047685 | A1 | 2/2010 | Lee et al. |
| 2010/0167111 | A1 | 7/2010 | Sumihara et al. |
| 2011/0064991 | A1 | 3/2011 | Ahn |
| 2011/0123844 | A1 | 5/2011 | Bhardwaj et al. |
| 2011/0183183 | A1 | 7/2011 | Grady et al. |
| 2011/0269007 | A1 | 11/2011 | Visco et al. |
| 2012/0015223 | A1 | 1/2012 | Bhardwaj et al. |
| 2012/0121965 | A1 | 5/2012 | Makino et al. |
| 2012/0177953 | A1 | 7/2012 | Bhardwaj et al. |
| 2013/0252053 | A1 | 9/2013 | Woo |
| 2014/0065457 | A1 | 3/2014 | Bhardwaj et al. |
| 2014/0113184 | A1 | 4/2014 | Hamel et al. |
| 2014/0170467 | A1 | 6/2014 | Kwon et al. |
| 2014/0322575 | A1 | 10/2014 | Hwang et al. |
| 2015/0044536 | A1 | 2/2015 | Kwon et al. |
| 2015/0207111 | A1 | 7/2015 | Tao |
| 2016/0293996 | A1 | 10/2016 | Bhardwaj et al. |
| 2017/0125849 | A1 | 5/2017 | Bhardwaj et al. |

FOREIGN PATENT DOCUMENTS

| | | | |
|---|---|---|---|
| CN | | 1599099 | 3/2005 |
| CN | | 1780036 | 5/2006 |
| CN | | 1808753 | 7/2006 |
| CN | | 201038228 | 3/2008 |
| CN | | 201122626 | 9/2008 |
| CN | | 101411005 | 4/2009 |
| CN | | 101485032 | 7/2009 |
| CN | | 101523656 | 9/2009 |
| CN | | 101542817 | 9/2009 |
| CN | | 201387915 | 1/2010 |
| CN | | 201387915 Y | * 1/2010 |
| CN | | 102047465 | 5/2011 |
| CN | | 102237508 | 11/2011 |
| CN | | 102881914 | 1/2013 |
| EP | | 1102336 | 5/2001 |
| EP | | 1195838 | 4/2002 |
| EP | | 1569252 | 8/2005 |
| EP | | 1895610 | 3/2008 |
| EP | | 2325929 | 5/2011 |
| EP | | 2654102 | 10/2013 |
| JP | | 63-33543 | 12/1994 |
| JP | | 1997-82361 | 3/1997 |
| JP | | H09-259859 | 10/1997 |
| JP | | 2000-021453 | 1/2000 |
| JP | | 2000-285881 | 10/2000 |
| JP | | 2000285881 A | * 10/2000 |
| JP | | 2001-028275 | 1/2001 |
| JP | | 2001-273930 | 10/2001 |
| JP | | 2003-234094 | 8/2003 |
| JP | | 2003234094 A | * 8/2003 |
| JP | | 2004-111219 | 4/2004 |
| JP | | 2005-011660 | 1/2005 |
| JP | | 2005-228573 | 8/2005 |
| JP | | 2008-066089 | 3/2008 |
| JP | | 2008-123955 | 5/2008 |
| JP | | 2009-152204 | 7/2009 |
| JP | | 2012-018795 | 1/2012 |
| JP | | 2013-62137 | 4/2013 |
| JP | | 2013-098080 | 5/2013 |
| KR | | 2003-0066960 | 8/2003 |
| KR | | 20030066960 A | * 8/2003 |
| KR | | 10-2006-28184 | 3/2006 |
| KR | | 2007-0096280 | 10/2007 |
| KR | | 100883922 | 10/2007 |
| KR | | 2008-0019311 | 3/2008 |
| KR | | 100905390 | 3/2008 |
| KR | | 20080019311 A | * 3/2008 |
| KR | | 10-2009-0045365 | 5/2009 |
| TW | | I260101 | 8/2006 |
| TW | | I283941 | 7/2007 |
| TW | | M332265 | 5/2008 |
| TW | | M341313 | 9/2008 |
| TW | | M363159 | 8/2009 |
| TW | | 201230439 | 7/2012 |
| TW | | 201230447 | 7/2012 |
| TW | | 201230457 | 7/2012 |
| TW | | 201232877 | 8/2012 |
| WO | | WO 2005/074057 | 11/2005 |
| WO | | WO 2005/117189 | 12/2005 |
| WO | | WO 2010/022669 | 4/2010 |
| WO | | WO 2011/092486 | 8/2011 |

(56) References Cited

FOREIGN PATENT DOCUMENTS

| WO | WO 2011/115464 | 9/2011 |
| WO | WO 2012/060972 | 5/2012 |
| WO | WO 2012/086793 | 6/2012 |

* cited by examiner

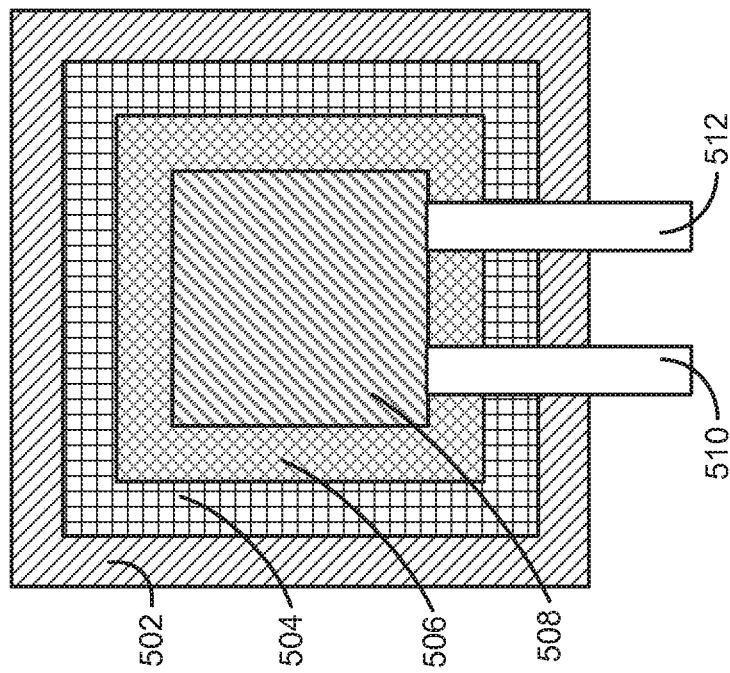
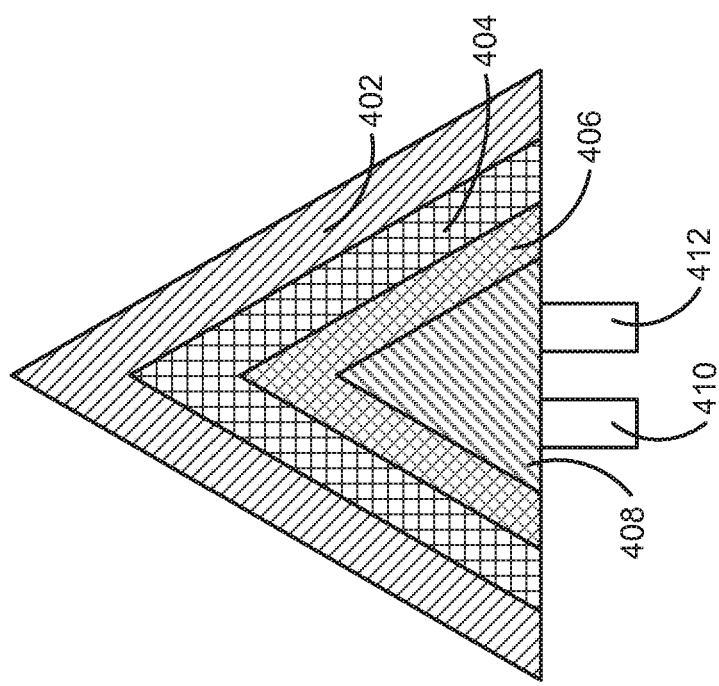

CONSTRUCTION OF NON-RECTANGULAR BATTERIES

CROSS-REFERENCE TO RELATED APPLICATION

This application is a continuation of U.S. patent application Ser. No. 14/606,975, entitled "Design and Construction of Non-Rectangular Batteries," filed on Jan. 27, 2015, now U.S. Pat. No. 10,135,097, which is a continuation of U.S. patent application Ser. No. 12/837,932, entitled "Design and Construction of Non-Rectangular Batteries," filed on Jul. 16, 2010, now U.S. Pat. No. 8,940,429, each of which is incorporated by reference in its entirety as if fully disclosed herein.

TECHNICAL FIELD

The present embodiments relate to batteries for portable electronic devices. More specifically, the present embodiments relate to the design and constructions of non-rectangular battery cells to facilitate efficient use of space within portable electronic devices.

BACKGROUND

Rechargeable batteries are presently used to provide power to a wide variety of portable electronic devices, including laptop computers, mobile phones, PDAs, digital music players and cordless power tools. The most commonly used type of rechargeable battery is a lithium battery, which can include a lithium-ion or a lithium-polymer battery.

Lithium-polymer batteries often include cells that are packaged in flexible pouches. Such pouches are typically lightweight and inexpensive to manufacture. Moreover, pouches may be tailored to various cell dimensions, allowing lithium-polymer batteries to be used in space-constrained portable electronic devices such as mobile phones, laptop computers, and/or digital cameras. For example, a lithium-polymer battery cell may achieve a packaging efficiency of 90-95% by enclosing rolled electrodes and electrolyte in an aluminized laminated pouch. Multiple pouches may then be placed side-by-side within a portable electronic device and electrically coupled in series and/or in parallel to form a battery for the portable electronic device.

However, efficient use of space may be limited by the use and arrangement of cells in existing battery pack architectures. In particular, battery packs typically contain rectangular cells of the same capacity, size, and dimensions. The physical arrangement of the cells may additionally mirror the electrical configuration of the cells. For example, a six-cell battery pack may include six lithium-polymer cells of the same size and capacity configured in a two in series, three in parallel (2s3p) configuration. Within the battery pack, two rows of three cells placed side-by-side may be stacked on top of each other; each row may be electrically coupled in a parallel configuration and the two rows electrically coupled in a series configuration. Consequently, the battery pack may require space in a portable electronic device that is at least the length of each cell, twice the thickness of each cell, and three times the width of each cell. Furthermore, the battery pack may be unable to utilize free space in the portable electronic device that is outside of a rectangular space reserved for the battery pack.

Hence, the use of portable electronic devices may be facilitated by improvements related to the packaging efficiency, capacity, form factor, cost, design, and/or manufacturing of battery packs containing lithium-polymer battery cells.

SUMMARY

The disclosed embodiments relate to a battery cell which includes a first electrode sheet having a first area and a second electrode sheet having a second area. The second area may be less than the first area. The battery cell also includes a first conductive tab coupled to the first electrode sheet and a second conductive tab coupled to the second electrode sheet. The battery cell further includes an insulator disposed between the second conductive tab and the first electrode sheet, the insulator configured to prevent electrical current from flowing between the first electrode sheet and the second conductive tab. The battery cell also includes a pouch that encloses the first and second electrode sheets and a first and second battery terminal extending through the pouch. The first battery terminal may be coupled to the first conductive tab, and the second battery terminal may be coupled to the second conductive tab.

A method for providing a power source for a portable electronic device is disclosed. The method includes arranging a first electrode sheet and a second electrode sheet in a stacked configuration, the first electrode sheet having a first area and the second electrode sheet having a second area that is less than the first area. The method further includes connecting a first conductive tab to a first battery terminal, the first conductive tab extending from the first electrode sheet, and connecting a second conductive tab to a second battery terminal, the second conductive tab extending from the second electrode sheet. The method also includes disposing an insulator in between the second conductive tab and the first electrode sheet, the insulator configured to prevent electrical current from flowing between the first electrode sheet to the second conductive tab, and enclosing the first and second electrode sheets in a pouch.

In some embodiments, a portable electronic device is disclosed that includes a set of components powered by a battery pack. The battery pack includes a first electrode sheet having a first area, a second electrode sheet having a second area that is less than the first area, a first conductive tab coupled to the first electrode sheet, and a second conductive tab coupled to the second electrode sheet. An insulator is disposed between the second conductive tab and the first electrode sheet and is configured to prevent electrical current from flowing between the first electrode sheet and the second conductive tab. The battery pack also includes a pouch to enclose the first and second electrode sheets, and a first and second battery terminal extending through the pouch. The first battery terminal may be coupled to the first conductive tab, and the second battery terminal may be coupled to the second conductive tab.

BRIEF DESCRIPTION OF THE DRAWINGS

FIG. 4 shows a non-rectangular design for a battery cell in accordance with an embodiment.

FIG. 5 shows a non-rectangular design for a battery cell in accordance with an embodiment.

In the figures, like reference numerals refer to the same figure elements.

DETAILED DESCRIPTION

Figure 1:
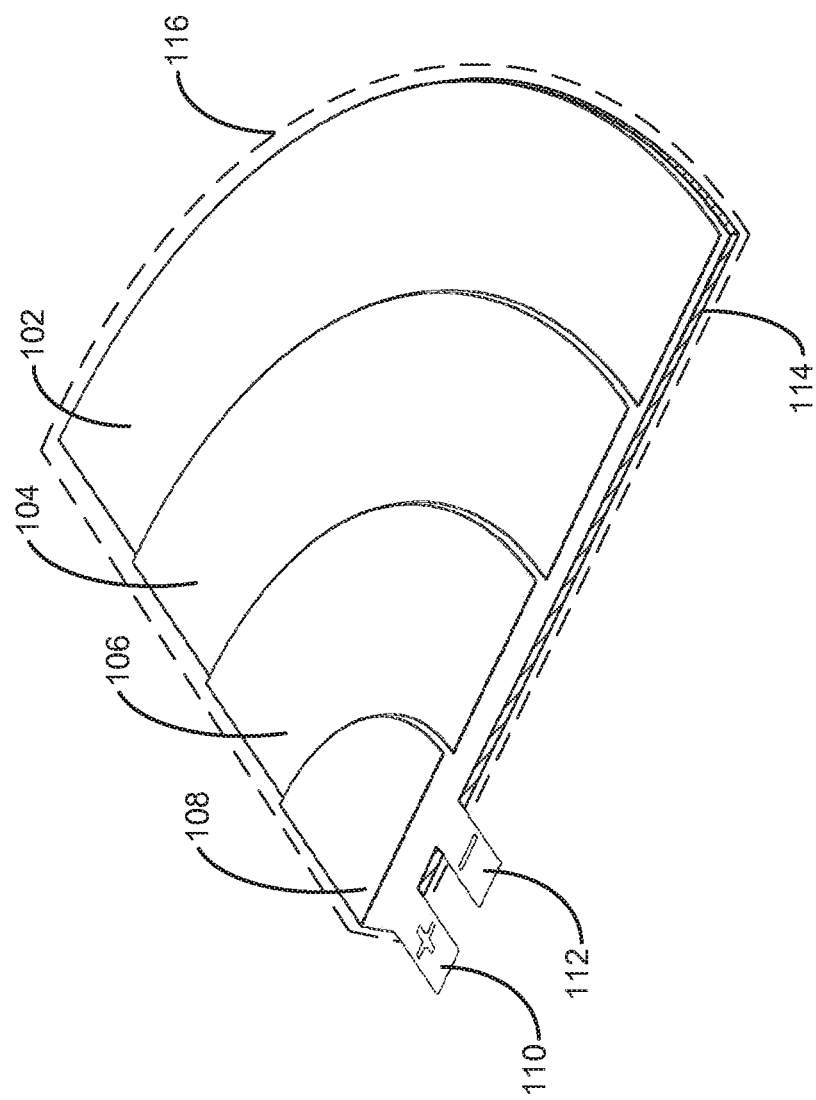
FIG. 1 shows a battery cell in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a battery cell with a non-rectangular design. The battery cell may include a set of electrode sheets of different dimensions arranged in a stacked configuration. The non-rectangular shape of the stacked configuration may facilitate efficient use of space in a portable electronic device. The term "non-rectangular" can mean that the cells are not rectangular through any cutting plane, which means that the cells are not rectangular when viewed from the top, bottom, or sides. For example, the non-rectangular stacked configuration may be based on a toroidal design, an L-shaped design, a triangular design, a pie-shaped design, a cone-shaped design, and/or a pyramidal design. The electrode sheets may also be enclosed in a pouch to form a lithium-polymer battery cell. Moreover, a rigid plate may be disposed beneath the electrode sheets inside the pouch to provide structural support for the battery cell.

The electrode sheets may then be electrically coupled in a parallel configuration. In particular, the cathode of each electrode sheet may be electrically coupled to one of a first set of conductive tabs, and the anode of each electrode sheet may be electrically coupled to one of a second set of conductive tabs. The first set of conductive tabs may then be electrically coupled using a wire-bonding technique, a spot-welding technique, a crimping technique, a riveting technique, and/or an ultrasonic-welding technique. The same technique(s) may also be used to electrically couple the second set of conductive tabs. The first and second sets of conductive tabs may extend through seals in the pouch to provide terminals for the battery cell.

FIG. 1 shows a battery cell in accordance with an embodiment. The battery cell may supply power to a portable electronic device such as a laptop computer, mobile phone, tablet computer, personal digital assistant (PDA), portable media player, digital camera, and/or other type of battery-powered electronic device.

As shown in FIG. 1, the battery cell includes a number of layers 102, 104, 106 and 108 that form a wedge-shaped, terraced structure. Layers 102-108 may be formed from thin electrode sheets; each electrode sheet may provide a cathode for the battery cell on one side and an anode for the battery cell on the other side. For example, each electrode sheet may have a thickness of around 20 microns. The electrode sheet may also include an anode of lithium or zinc and a cathode of manganese dioxide.

Moreover, the electrode sheets may be arranged in a stacked configuration to form layers 102-108. In particular, the terraced, curved structure of the battery cell may be created using flat pie-shaped electrode sheets of four different sizes. First, a series of electrode sheets of the largest size may be stacked to form layer 102, then a series of smaller pie-shaped electrode sheets may be stacked on top of layer 102 to form layer 104. After layers 102-104 are formed, a number of the third-largest electrode sheets may be stacked on top of layer 104 to form layer 106, and finally, the smallest electrode sheets are placed on top of layer 106 to form layer 108.

To form a power source, the electrode sheets may be electrically coupled in a parallel configuration and enclosed in a pouch 116. To electrically couple the electrode sheets, each cathode from the electrode sheets may be electrically coupled to one of a first set of conductive tabs, and each anode from the electrode sheets may be electrically coupled to one of a second set of conductive tabs. The first set of conductive tabs may then be electrically coupled using a wire-bonding technique, a spot-welding technique, a crimping technique, a riveting technique, and/or an ultrasonic-welding technique to form a positive terminal 110 for the battery cell.

The same technique(s) may also be used to electrically couple the second set of conductive tabs to form a negative terminal 112 for the battery cell. For example, the battery cell may be assembled by stacking electrode sheets coupled to conductive tabs against one or more surfaces that align the corners of the electrode sheets and the conductive tabs. The conductive tabs may then be spot-welded together to form terminals 110-112.

To enclose the battery cell in pouch 116, layers 102-108 may be placed on top of a sheet of polymer laminate and/or another type of flexible pouch material. Another sheet of pouch material may then be placed over the tops of layers 102-108, and the two sheets may be heat-sealed and/or folded. Alternatively, layers 102-108 may be placed in between two sheets of pouch material that are sealed and/or folded on some (e.g., non-terminal) sides. The remaining side(s) may then be heat-sealed and/or folded to enclose layers 102-108 within pouch 116. Terminals 110-112 may extend through seals in pouch 116 to allow the battery cell to be electrically coupled to other components in the portable electronic device.

Those skilled in the art will appreciate that the thin and/or flexible nature of the electrode sheets may cause the electrode sheets to bend and/or deform within the battery cell during handling and/or installation within the portable electronic device. As a result, a rigid plate 114 may be disposed beneath layers 102-108 to provide structural support for the battery cell.

In one or more embodiments, the battery cell of FIG. 1 facilitates efficient use of space within the portable electronic device. For example, the terraced and/or curved edges of the battery cell may allow the battery cell to fit within a curved enclosure for the portable electronic device. The number of layers (e.g., layers 102-108) may also be increased or decreased to better fit the curvature of the portable electronic device's enclosure. In other words, the battery cell may include an asymmetric and/or non-rectangular design that accommodates the shape of the portable electronic device. In turn, the battery cell may provide greater capacity, packaging efficiency, and/or voltage than rectangular battery cells in the same portable electronic device. Non-rectangular designs for battery cells are discussed in further detail below with respect to FIGS. 2-5.

Figure 2:
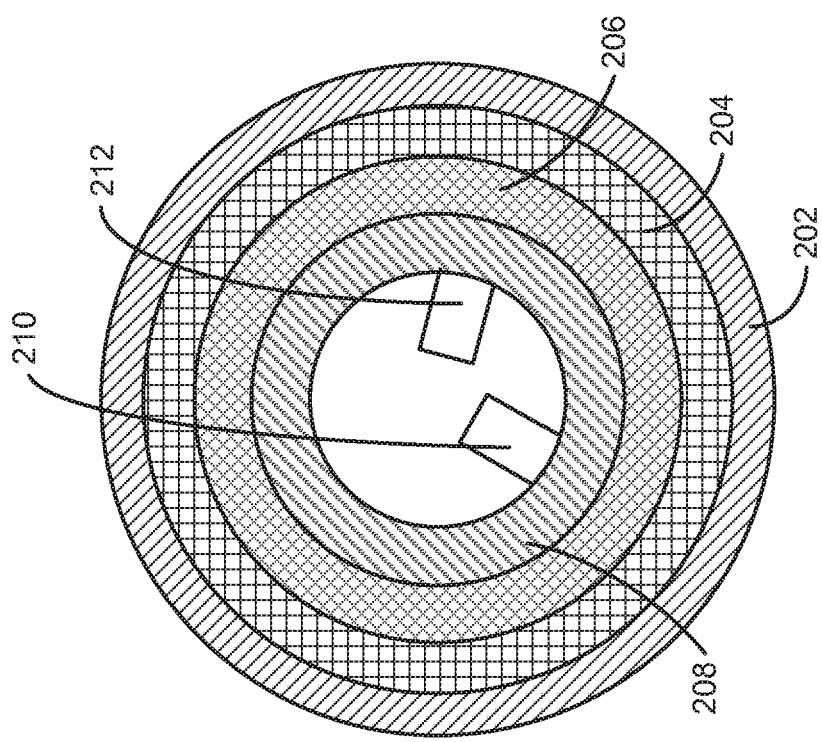
FIG. 2 shows a non-rectangular design for a battery cell in accordance with an embodiment.

FIG. 2 shows a non-rectangular design for a battery cell in accordance with an embodiment. More specifically, FIG. 2 shows a top-down view of a battery cell with a number of layers 202, 204, 206 and 208. Layers 202-208 may be formed by arranging electrode sheets of different dimensions in a stacked configuration that is based on a toroidal and/or cone-shaped design for the battery cell. Consequently, the electrode sheets used in the battery cell of FIG. 2 may be round and/or ellipsoidal.

Moreover, the electrode sheets forming layers 202-208 may be hollow to enable the formation of two terminals 210-212. Each terminal 210-212 may include a set of conductive tabs that connects the cathodes or the anodes of the electrode sheets. For example, terminal 210 may correspond to a positive terminal for the battery cell and include a first set of conductive tabs electrically coupled to one another and to the cathodes of the electrode sheets. Terminal 212 may correspond to a negative terminal for the battery cell and include a second set of conductive tabs electrically coupled to one another and to the anodes of the electrode sheets.

The battery cell of FIG. 2 may be designed to fit around the perimeter of a portable electronic device. For example, layers 202-208 may accommodate a curved and/or scalloped outline of the portable electronic device, while the hollow interior of the battery cell may allow components (e.g., printed circuit boards (PCBs), processors, memory, storage, display, optical drives, etc.) to be placed in the middle of the portable electronic device. Placement of battery cells within portable electronic devices is discussed in further detail below with respect to FIGS. 6-7.

Figure 3:
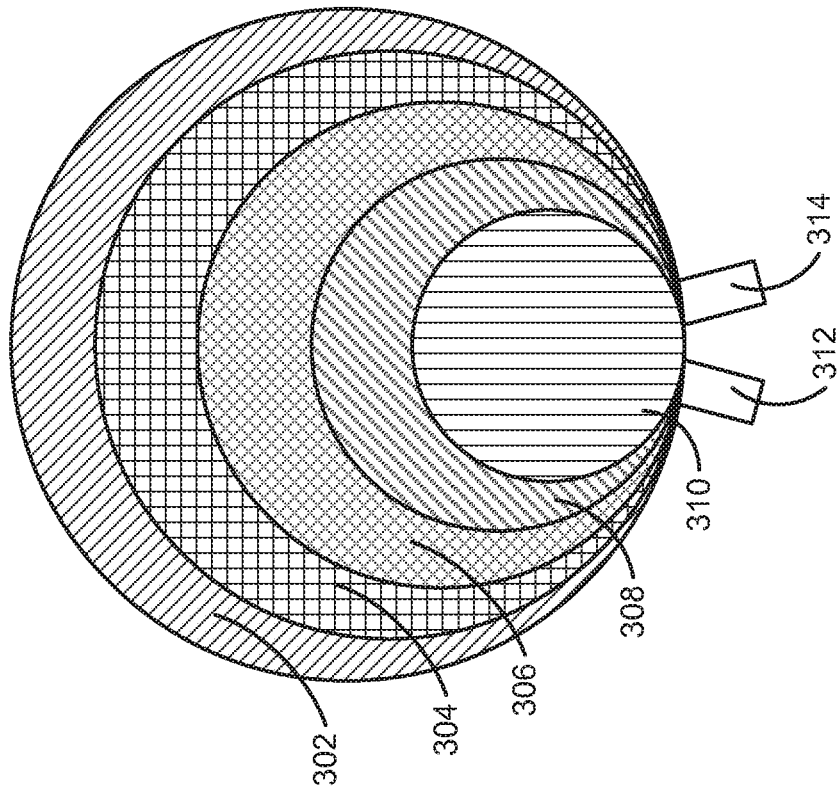
FIG. 3 shows a non-rectangular design for a battery cell in accordance with an embodiment.

FIG. 3 shows a non-rectangular design for a battery cell in accordance with an embodiment. As with the battery cell of FIG. 2, the battery cell of FIG. 3 includes a number of layers 302, 304, 306, 308 and 310 formed by stacking round and/or ellipsoidal electrode sheets of the same thickness (e.g., 10-20 microns) and varying sizes. However, because layers 302-310 are not hollow, terminals 312-314 for the battery cell may be placed outside layers 302-310. The skewed-cone shape of the battery cell may allow the battery cell to fit within a recessed pocket in a portable electronic device.

FIG. 4 shows a non-rectangular design for a battery cell in accordance with an embodiment. The battery cell of FIG. 4 may be formed from four layers 402, 404, 406 and 408 of triangular electrode sheets that are aligned along one edge and stacked. Each layer individual layer 402, 404, 406 and 408 may include electrode sheets of the same size, while the different layers 402, 404, 406 and 408 may be formed from electrode sheets of four different sizes. The battery cell may thus be based on a pyramidal and/or triangular design. Furthermore, a set of terminals 410-412 may electrically couple the electrode sheets in a parallel configuration and allow the battery cell to supply power to a portable electronic device.

FIG. 5 shows a non-rectangular design for a battery cell in accordance with an embodiment. The battery cell of FIG. 5 may include four layers 502, 504, 506 and 508 of square electrode sheets arranged in a stacked configuration. However, unlike the battery cells of FIGS. 1-4, the electrode sheets of FIG. 5 may be centered on top of each other. As a result, terminals 510-512 for the battery cell may be formed from conductive tabs that overlap with surfaces of electrode sheets to which the conductive tabs should not be electrically coupled. For example, conductive tabs that are electrically coupled to electrode sheets of layer 504 may overlap with the topmost electrode sheet of layer 502.

To prevent electric current from flowing between overlapping electrode sheets and conductive tabs, a conductive tab may be insulated from an overlapping surface of an electrode sheet to which the conductive tab should not be electrically coupled by placing a layer of insulating material such as Kapton (Kapton™ is a registered trademark of E. I. du Pont de Nemours and Company Corporation) in between the conductive tab and the electrode sheet. Such use of insulating materials in the battery cell may enable the creation of battery cells of arbitrary three-dimensional (3D) shapes, which in turn may further facilitate the efficient use of space inside portable electronic devices that use the battery cells.

Figure 6:
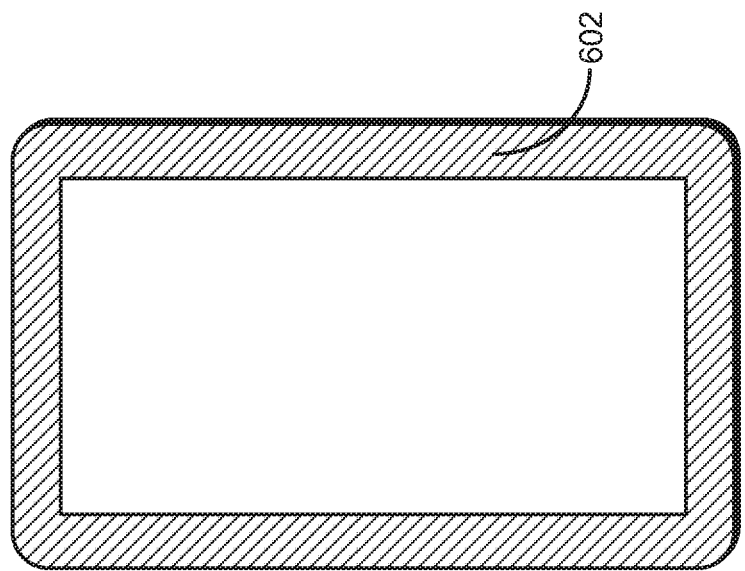
FIG. 6 shows the placement of a battery within a portable electronic device in accordance with an embodiment.

FIG. 6 shows the placement of a battery 602 within a portable electronic device in accordance with an embodiment. As shown in FIG. 6, a top-down view of battery 602 shows that battery 602 is placed along the outside perimeter of the portable electronic device. Furthermore, the battery may include a toroidal, L-shaped, and/or pie-shaped design to accommodate a curved and/or scalloped shape of the portable electronic device. The interior of the battery may be hollow to allow components to be placed within the portable electronic device.

Figure 7:
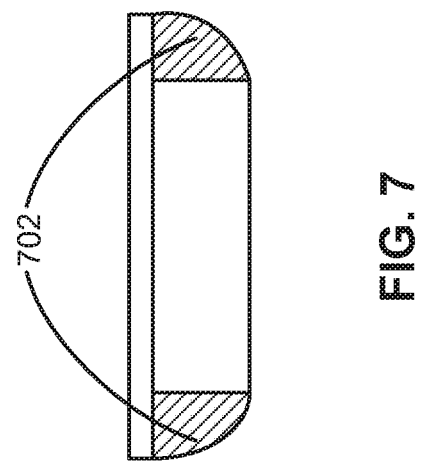
FIG. 7 shows the placement of a battery within a portable electronic device in accordance with an embodiment.

FIG. 7 shows the placement of a battery 702 within a portable electronic device in accordance with an embodiment. Battery 702 may be based on the same design as battery 602 of FIG. 6. More specifically, a cross-sectional view of battery 702 shows that battery 702 fills up the space along the curved sides of the portable electronic device. As a result, battery 702 may represent increased packaging efficiency and/or capacity over a rectangular battery that is used in the same portable electronic device.

Figure 8:
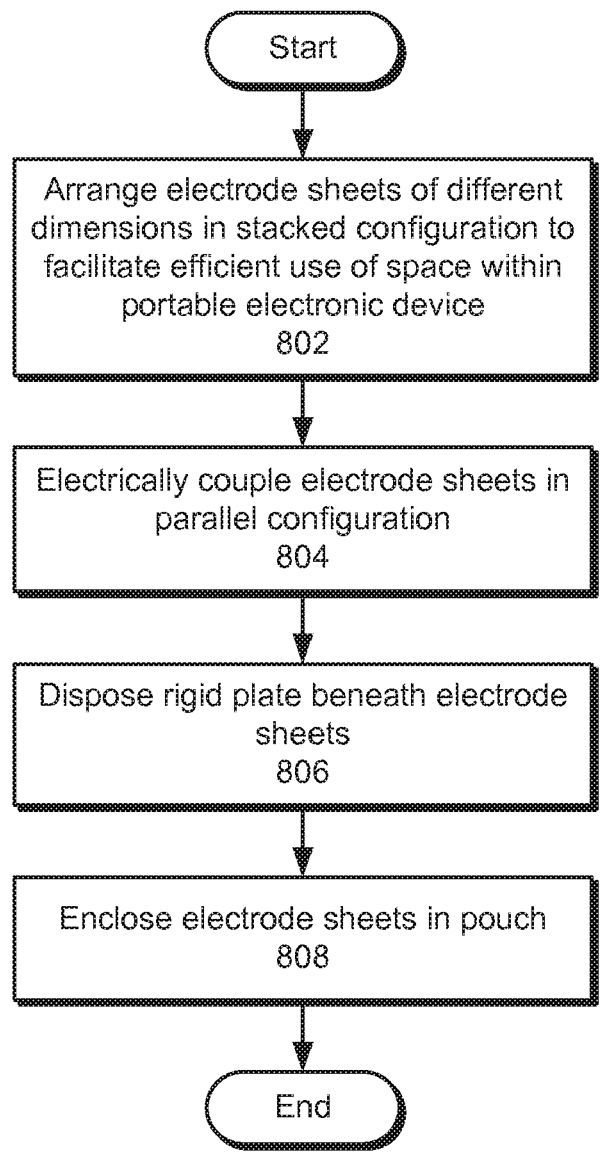
FIG. 8 shows a flowchart illustrating the process of manufacturing a battery cell in accordance with an embodiment.

FIG. 8 shows a flowchart illustrating the process of manufacturing a battery cell in accordance with an embodiment. In one or more embodiments, one or more of the steps may be omitted, repeated, and/or performed in a different order. Accordingly, the specific arrangement of steps shown in FIG. 8 should not be construed as limiting the scope of the embodiments.

First, a set of electrode sheets of different dimensions is arranged in a stacked configuration to facilitate efficient use of space within a portable electronic device (operation 802). For example, electrode sheets of the same thickness and varying lengths and/or widths may be stacked to form a battery cell that is based on a non-rectangular (e.g., toroidal, L-shaped, triangular, pie-shaped, cone-shaped, pyramidal) battery design.

Next, the electrode sheets are electrically coupled in a parallel configuration (operation 804). Each cathode from the electrode sheets may be electrically coupled to one of a first set of conductive tabs, and each anode from the electrode sheets may be electrically coupled to one of a second set of conductive tabs. The first set of conductive tabs may then be electrically coupled using a wire-bonding technique, a spot-welding technique, a crimping technique, a riveting technique, and/or an ultrasonic-welding technique to form a positive terminal for the battery cell. The same technique(s) may also be used to electrically couple the second set of conductive tabs to form a negative terminal for the battery cell. In addition, a conductive tab may be insulated from an overlapping surface of an electrode sheet to which the conductive tab should not be electrically coupled by placing a layer of insulating material such as Kapton in between the conductive tab and the electrode sheet.

A rigid plate may also be disposed beneath the electrode sheets (operation 806) to provide structural support for the battery cell. Such structural support may prevent the battery cell from flexing and/or distorting during handling and/or installation within a portable electronic device. Finally, the electrode sheets and rigid plate may be enclosed in a pouch (operation 808). Consequently, the battery cell may correspond to a lithium-polymer battery cell that is designed to accommodate the shape of the portable electronic device. For example, the battery cell may be placed within a curved interior of the portable electronic device to provide increased capacity and/or packaging efficiency over battery packs containing rectangular cells.

Figure 9:
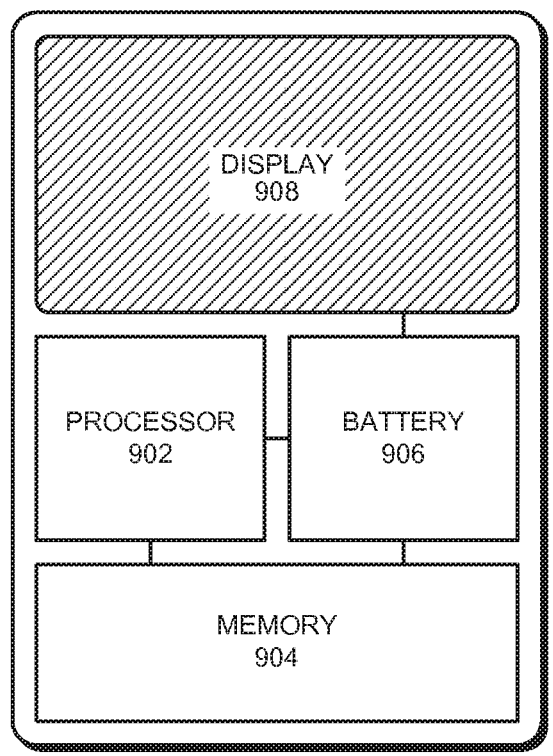
FIG. 9 shows a portable electronic device in accordance with an embodiment.

The above-described rechargeable battery cell can generally be used in any type of electronic device. For example, FIG. 9 illustrates a portable electronic device 900 which includes a processor 902, a memory 904 and a display 908, which are all powered by a battery 906. Portable electronic device 900 may correspond to a laptop computer, mobile phone, PDA, portable media player, digital camera, and/or other type of battery-powered electronic device. Battery 906 may correspond to a battery pack that includes one or more battery cells. Each battery cell may include a set of electrode sheets of different dimensions arranged in a stacked configuration. The stacked configuration may facilitate efficient use of space inside portable electronic device 900. For example, the stacked configuration may allow battery 906 to fit along the perimeter of a mobile phone with a scalloped shape.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A battery cell, comprising:
 a first electrode sheet having a first area;
 a second electrode sheet having a second area, wherein the second area is less than the first area;
 a first conductive tab coupled to the first electrode sheet;
 a second conductive tab coupled to the second electrode sheet;
 a pouch enclosing the first and second electrode sheets; and
 a first and second battery terminal extending through the pouch, wherein the first battery terminal is coupled to the first conductive tab, and wherein the second battery terminal is coupled to the second conductive tab
  wherein at least one of the first and second electrode sheets comprises a hollow interior portion, wherein the hollow interior portion is entirely surrounded by a sidewall of the at least one of the first and second electrode sheets, and wherein at least one of the first and second battery terminals extend within the hollow interior portion.

2. The battery cell of claim 1, wherein the first and second electrode sheets are round.

3. The battery cell of claim 1, wherein the first and second electrode sheets are ellipsoidal.

4. The battery cell of claim 1, wherein the first and second electrode sheets are triangular.

5. The battery cell of claim 1, wherein the first and second electrode sheets are square.

6. The battery cell of claim 1, wherein the first and second electrode sheets cooperate to define a terrace at an outer edge of the first and second electrode sheets.

7. The battery cell of claim 1, further comprising a rigid plate disposed proximate to the first electrode sheet, wherein the rigid plate is enclosed by the pouch.

8. A method for providing a power source for a portable electronic device, comprising:
 arranging a first electrode sheet and a second electrode sheet in a stacked configuration, wherein the first electrode sheet has a first area and the second electrode sheet has a second area, wherein the second area is less than the first area;
 connecting a first conductive tab to a first battery terminal, wherein the first conductive tab extends from the first electrode sheet;
 connecting a second conductive tab to a second battery terminal, wherein the second conductive tab extends from the second electrode sheet; and
 enclosing the first and second electrode sheets in a pouch
  wherein at least one of the first and second electrode sheets comprises a hollow interior portion, wherein the hollow interior portion is entirely surrounded by a sidewall of the at least one of the first and second electrode sheets, and wherein at least one of the first and second battery terminals extend within the hollow interior portion.

9. The method of claim 8, wherein the first and second electrode sheets are round.

10. The method of claim 8, wherein the first and second electrode sheets are ellipsoidal.

11. The method of claim 8, wherein the first and second electrode sheets are triangular.

12. The method of claim 8, wherein the first and second electrode sheets are square.

13. The method of claim 8, wherein the first and second electrode sheets cooperate to define a terrace at an outer edge of the first and second electrode sheets.

14. The method of claim 8, further comprising:
disposing a rigid plate proximate to the first electrode sheet; and
enclosing the rigid plate within the pouch.

15. A portable electronic device, comprising:
a set of components powered by a battery pack, the battery pack comprising:
- a first electrode sheet having a first area;
- a second electrode sheet having a second area, wherein the second area is less than the first area;
- a first conductive tab coupled to the first electrode sheet;
- a second conductive tab coupled to the second electrode sheet;
- a pouch enclosing the first and second electrode sheets; and
- a first and second battery terminal extending through the pouch, wherein the first battery terminal is coupled to the first conductive tab, and wherein the second battery terminal is coupled to the second conductive tab
- wherein at least one of the first and second electrode sheets comprises a hollow interior portion, wherein the hollow interior portion is entirely surrounded by a sidewall of the at least one of the first and second electrode sheets, and wherein at least one of the first and second battery terminals extend within the hollow interior portion.

16. The portable electronic device of claim 15, wherein the first and second electrode sheets cooperate to define a terrace at an outer edge of the first and second electrode sheets.

17. The portable electronic device of claim 15, further comprising a rigid plate disposed proximate to the first electrode sheet, wherein the rigid plate is enclosed by the pouch.

* * * * *